(12) United States Patent
Sutton et al.

(10) Patent No.: US 6,334,959 B1
(45) Date of Patent: *Jan. 1, 2002

(54) FILTER LIFE MEASUREMENT

(75) Inventors: David Ian Sutton; Julian Mark Maccabee, both of Hampshire (GB)

(73) Assignee: Pall Corporation, East Hills, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,169
(22) PCT Filed: Mar. 17, 1998
(86) PCT No.: PCT/GB98/00788
  § 371 Date: Dec. 6, 1999
  § 102(e) Date: Dec. 6, 1999
(87) PCT Pub. No.: WO98/42425
  PCT Pub. Date: Oct. 1, 1998

(30) Foreign Application Priority Data

Mar. 20, 1997 (GB) .............................................. 9705818

(51) Int. Cl.[7] .............................................. G01N 15/08
(52) U.S. Cl. .......................................... 210/767; 73/38
(58) Field of Search ........................... 210/85, 87, 741, 210/767, 90, 93; 73/38, 61.67, 61.73; 702/34; 340/607

(56) References Cited

U.S. PATENT DOCUMENTS

| | | |
|---|---|---|
| 4,263,805 A | 4/1981 | Isley et al. |
| 4,681,677 A | 7/1987 | Kuh et al. |
| 4,685,066 A | 8/1987 | Hafele et al. |
| 5,036,698 A | 8/1991 | Conti |
| 5,702,592 A | 12/1997 | Suri et al. |

FOREIGN PATENT DOCUMENTS

| | | |
|---|---|---|
| DE | 19504327 A1 | 8/1996 |
| GB | 2 106 417 A | 4/1983 |
| GB | 2 195 555 A | 4/1988 |
| GB | 2 250 452 A | 6/1992 |
| GB | 2 278 295 A | 11/1994 |
| GB | 2 303 082 A | 2/1997 |
| WO | WO 92/22373 | 12/1992 |

OTHER PUBLICATIONS

Designer's Corner—Useful Technology for Your Ideal File, "Hydraulic–filter Monitor", Design News/Oct. 20, 1997, p. 54.

Primary Examiner—Matthew O. Savage
Assistant Examiner—Terry K. Cecil
(74) Attorney, Agent, or Firm—Leydig, Voit, & Mayer, Ltd.

(57) ABSTRACT

A method of measuring the remaining useful life of a filter may comprise flowing a particulate-laden fluid through a filter and measuring a parameter of the flow during the flowing. From the measurements of the parameter, measurements of the remaining useful life of the filter that vary linearly during the time in which the fluid is flowing through the filter may be produced. The method may include, storing in a store a previously measured correlation between the parameter and the remaining life for a trial filter corresponding to the filter on flowing the particulate-laden fluid therethrough. The store may receive the measurements of the parameter and output measurements of the remaining useful life corresponding to the received measurements of the parameter and derived from the previously measured correlation.

10 Claims, 2 Drawing Sheets

FILTER LIFE MEASUREMENT

This application claims the benefit of International Application PCT/GB98/00788, filed Mar. 17, 1998 and United Kingdom Application 9705818.4, filed Mar. 20, 1997, The invention relates to methods for measuring the remaining useful life of a filter during flow of a particulate-laden fluid through the filter.

BACKGROUND OF THE INVENTION

As a particulate-laden fluid passes through a filter, the particulates are retained in the filter. It is generally desirable to change or clean a filter element of the filter before it becomes completely blocked with particulates as further clogging could lead to excessive differential pressures within the filter. The point at which such a change or cleaning is desirable is called the end of the useful life of the filter.

One known method of indicating the end of the useful life of a filter measures the differential pressure of the fluid across the filter as fluid is passed through the filter and particulates are retained by the filter. As the amount of retained particulates increases, the differential pressure increases and, by previous testing, a differential pressure can be determined at which the filter is at the end of its useful life.

A known device detects the differential pressure across the filter and gives an alarm signal when the previously determined differential pressure is reached. This apparatus provides no indication of the rate at which the filter is retaining the particulates and thus no indication of the remaining useful life and does not allow prediction of when the filter will have to be replaced or cleaned.

Another known device also detects the differential pressure of the fluid across the filter and provides a rough indication of the differential pressure using a light emitting diode bar-graph. The number of diodes that are illuminated increases roughly in linear proportion to the increases in differential pressure. This apparatus does not readily allow a prediction of when it will be necessary to replace or clean the filter, because the changes in differential pressure are not linearly related to the changes in the remaining useful life of the filter.

SUMMARY OF THE INVENTION

According to an aspect of the invention, there is provided a method of measuring remaining useful life of a filter comprising flowing a particulate-laden fluid through the filter, measuring a parameter of the flow during the flowing, and producing, from the measurements of the parameter, measurements of the remaining usefull life of the filter that vary linearly during the time in which the fluid is flowing through the filter, including storing in a store a previously measured correlation between the parameter and remaining life for a trial filter corresponding to the filter on flowing the particulate-laden fluid therethrough, the store receiving the measurements of the parameter and outputting measurements of the remaining useful life corresponding to the received measurements of the parameter and derived from the previously measured correlation.

BRIEF DESCRIPTION OF THE DRAWINGS

The following is a more detailed description, by way of example, of an embodiment of the invention, reference being made to the accompanying drawings in which.

SPECIFIC DESCRIPTION OF THE INVENTION

Figure 1:
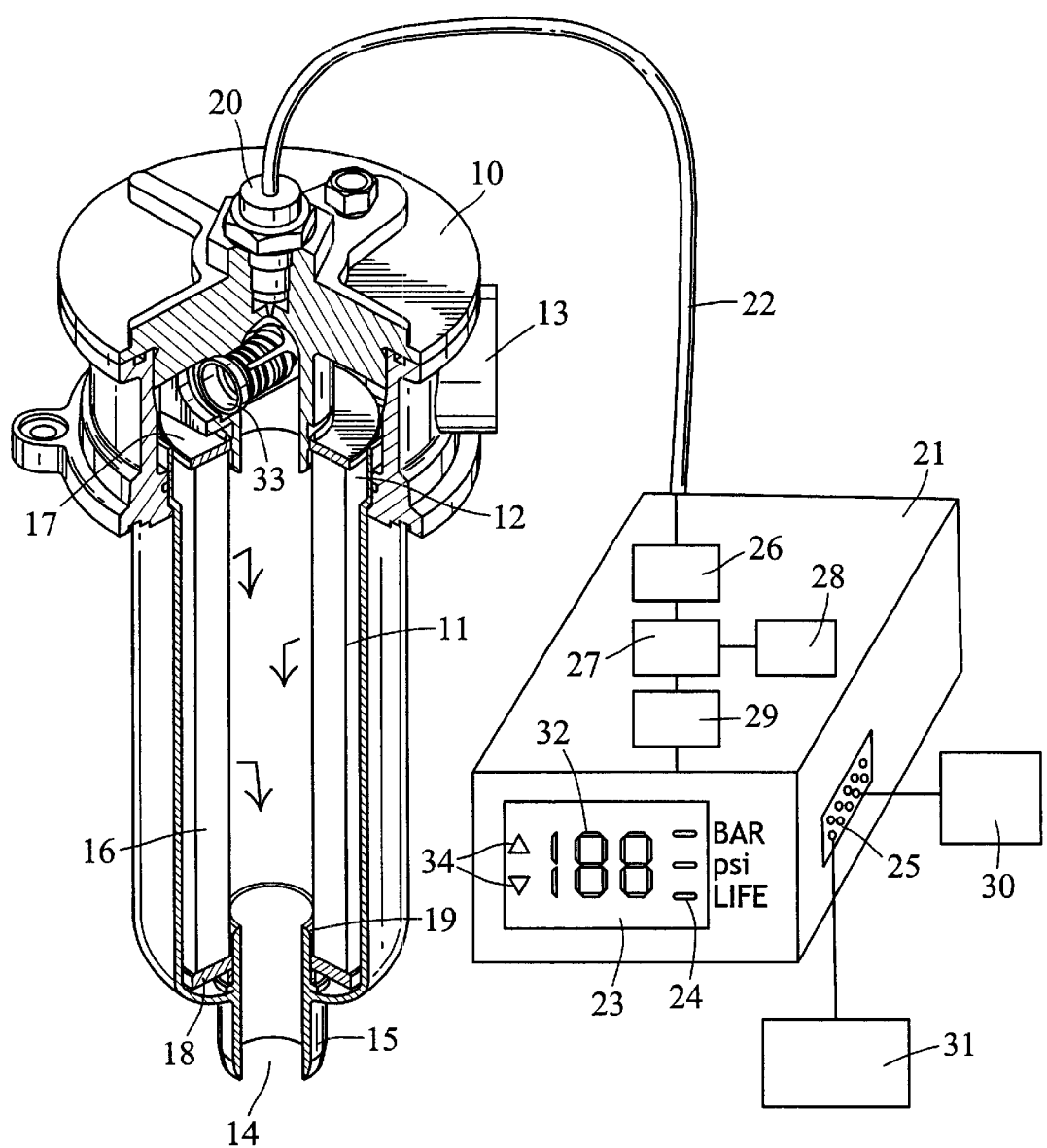
FIG. 1 shows a filter assembly including a filter element mounted in a housing, a differential pressure transducer of the filter assembly being connected to a data processor.

Referring to FIG. 1, the filter assembly comprises a housing 10 defining a chamber 12 having a fluid inlet 13 and a fluid outlet 14. A by-pass valve 33 is provided in a passage connecting the inlet 13 and the outlet 14 and opens to allow direct communication between the inlet 13 and the outlet 14 when excess differential pressure is detected. The outlet 14 is continuous with a mounting tube 15 which extends into the chamber 12. A filter element 11 is mounted within the housing 10 and comprises a cylinder of a filter medium 16 which is provided at one end with a first end cap 17 and which is provided at the other end with a second end cap 18. The fluid outlet 14 extends through the second end cap 18 and the by-pass passage leads through the first end cap 17. The filter medium 16 may be any suitable form of media such as a membrane or a depth filter medium. The second end cap 18 is provided centrally with an opening 19 which receives the mounting tube 15 so as to mount the filter element 11 within the housing 10. A seal (not shown) is provided between the mounting tube 15 and the perimeter of the opening 19.

The measuring device comprises a pressure transducer 20 and a processor 21. The transducer 20 is mounted in the housing 10 and detects the differential pressure between fluid in the inlet 13 and fluid in the outlet 14. The transducer 20 is connected via a cable 22 to the processor 21.

The processor 21 has a display 23, and a data inlet/outlet 25 provided with an RS 232 connector. The processor 21 also has a writable memory 26 and an analogue to digital converter 27.

The filter element 11 is used to filter a flow of fluid carrying suspended particulates. The fluid is pumped through the housing 10. The fluid passes through the inlet 13 into the chamber 12 (as shown by the arrows), where the fluid then passes around the filter element 11. The fluid flows through the filter medium 16 into the interior of the filter element 11. During-the passage of the fluid through the filter medium 16, particulates from the fluid are retained by the medium 16. The filtered, particle-depleted fluid passes out from the element 11 through the mounting tube 15 and the outlet 14 as shown by the arrows in FIG. 1.

The particulates retained by the filter medium 16 reduce the overall permeability of the medium 16. As more fluid passes through the medium 16, the volume of particulates retained by the medium 16 progressively increases and the overall permeability of the medium 16 progressively decreases. The remaining useful life thus decreases correspondingly. At the same time, the differential pressure of the fluid across the medium 16 increases.

The filter element 11 needs to be replaced or cleaned when the volume of particulates retained by the filter medium 16 reaches a predetermined level such that continued retention is likely to damage the filter medium 16 or is likely to render the filter medium 16 ineffective. Some filters are provided with a by-pass controlled by a valve that opens to allow direct fluid commmication between the filter inlet 13 and the filter outlet 14 when the differential pressure across the by-pass valve exceeds a predetermined level. At this level, the remaining useful life of the filter material 16 is zero. As indicated above, this level can be related to a particular differential pressure and in this example, the attainment of the particular differential pressure is used to indicate when the filter element 16 has zero remaining useful life (as described below).

The measuring device 20, 21, 22 uses the measured differential pressure to provide an indication of the remaining useful life of the filter medium 16 as determined by the blockage of the filter elements 16 by particulates and indicates the estimated remaining useful life in a way that varies generally linearly during the time that fluid is flowing through the filter (plainly there is no variation in useful life when the filter is not operational—this will occur in a filter used intermittently). Thus, if a differential pressure of, say, 0.04 bar occurs 3 hours into a 10 hours useful life of a filter, the receipt of a differential pressure signal corresponding to 0.04 bar will result in an indication that 30% of the useful life of the filter element 11 has passed (or that 70% of the useful life remains).

The pressure transducer 20 detects the differential pressure between the fluid in the inlet 13 and the fluid in the outlet 14 (which, of course, corresponds to the differential pressure of the fluid across the medium 16) and generates an analogue signal which varies over time as a function of the differential pressure. The signal is passed to the analogue to digital converter 27 of the processor 21 via the cable 22. The analogue to digital converter 27 produces from the analogue signal a sequence of digital signals corresponding to successive instantaneous values of the analogue signal and thus to successive measurements of the differential pressure.

The processor 21 stores in the memory 26 a set of values of differential pressure and the remaining useful life represented by those values. These are formulated and input into the memory 26 in a manner to be described below. As a digital differential pressure signal is received by the memory 26, the memory 26 produces the corresponding value of the remaining useful life. Where the received differential pressure signal falls between two stored values, an interpolator 28 generates the corresponding value of the remaining useful life. The interpolation may be linear.

The measurements are output as digital signals. In this example, these digital signals are used to produce signals representing percentages indicating the remaining proportion of the useful life of the filter element 16. For example, when the remaining time value is indicated as 10%, 10*% of useful life remains.

The current percentage of the remaining useful life is shown on the display 23; the display 23 being up-dated each time the remaining useful life changes by 1% (or any other suitable interval) to show the new value. The processor 21 also has a facility which allows the operator to display, when required, the current instantaneous measurement of the differential pressure. This is achieved by passing the instantaneous signal values from the transducer 20 to a display converter 29 which converts the instantaneous value signals into signals producing the appropriate indication on the display 23. The displayed value can be in any required units, such as psi or bar. As seen in FIG. 1, the display 23 includes a mode indicator 24 that indicates whether the displayed digits 32 are bar, psi or % remaining life.

The measurements of the remaining useful life or the corresponding instantaneous values of the differential pressure are stored in the memory.

If it is desired to monitor the measurements of the remaining useful life or the differential pressure values remotely from the measuring device, these measurements may be output to remote data logging equipment 30 using the data inlet/outlet 2.5.

The processor 21 may be programmed to produce an alarm message on the display 23 on receiving a signal corresponding to a differential pressure indicating that the remaining useful life is zero. Alarm messages may also be produced in the absence of a filter medium or on the sensing of a differential pressure above a predetermined level. These may be indicated by the arrows 34 on the display 23. Alarm messages may be produced at other predetermined stages in the monitoring process.

An operator can use the displayed remaining time values to predict when replacement or cleaning of the element 11 will be necessary and replace or clean the element 11 as soon as (or before) zero remaining useful life is indicated.

If required, the measurements of remaining useful life or differential pressure that have been stored in the memory during filtration can be down loaded to a computer 31 for analysis. This analysis may involve comparing the useful life of a first filter used in the housing 1u with the useful life of a subsequent filter or filters. This down-loading is done using the data inlet/outlet 25 and a suitable interrogating computer 31 using Windows (Trade Mark) based or other suitable software. The same computer is used to programme the processor 21 before filtration is commenced.

The stored data may be formulated by performing a trial run using a trial filter element corresponding to the element 11 to filter a particulate-laden fluid corresponding to, or corresponding as nearly as possible to, the particulate-laden fluid to be filtered by the filter element 16. The fluid is passed through the trial filter element at a constant rate. A pressure transducer of a similar type as the pressure transducer 20 is used to measure the differential pressure across the trial filter element. The elapsed time from the start of the trial run is also noted.

During this trial, the temperature of the fluid is monitored and the instantaneous values of the signal are corrected for any variation in temperature.

The trial run is continued until the blockage of the trial filter element by particulates reaches a level at which the trial filter element should be replaced or cleaned. The level can be determined empirically by observing at what differential pressure the filter medium is close to damage or inutility and choosing a pressure lower than this by a safety margin.

After the trial run, the measurements of the differential pressure and the corresponding set of measurements of the remaining useful life so that for each differential pressure measurement an associated remaining useful life figure is calculated. This data is recorded on a magnetic disc and input into the memory of the processor 21 using the inlet/outlet 25 and a suitable computer using WINDOWS™ based software. The processor 21 is thus able, on receiving a measurement of differential pressure from the transducer 20 to produce the corresponding measurement of remaining useful life via the data using interpolation if necessary, as described above. A first example of such data is shown in Table 1 below.

TABLE 1

| Differential Pressure (Bar) | Elapsed Useful Life (%) | Remaining Useful Life (%) |
| --- | --- | --- |
| 0 | 0 | 100 |
| 0.01 | 10 | 90 |
| 0.02 | 20 | 80 |
| 0.04 | 30 | 70 |
| 0.08 | 40 | 60 |
| 0.16 | 50 | 50 |
| 0.32 | 60 | 40 |
| 0.64 | 70 | 30 |
| 1.28 | 80 | 20 |
| 2.56 | 90 | 10 |
| 5.12 | 100 | 0 |

Figure 2:
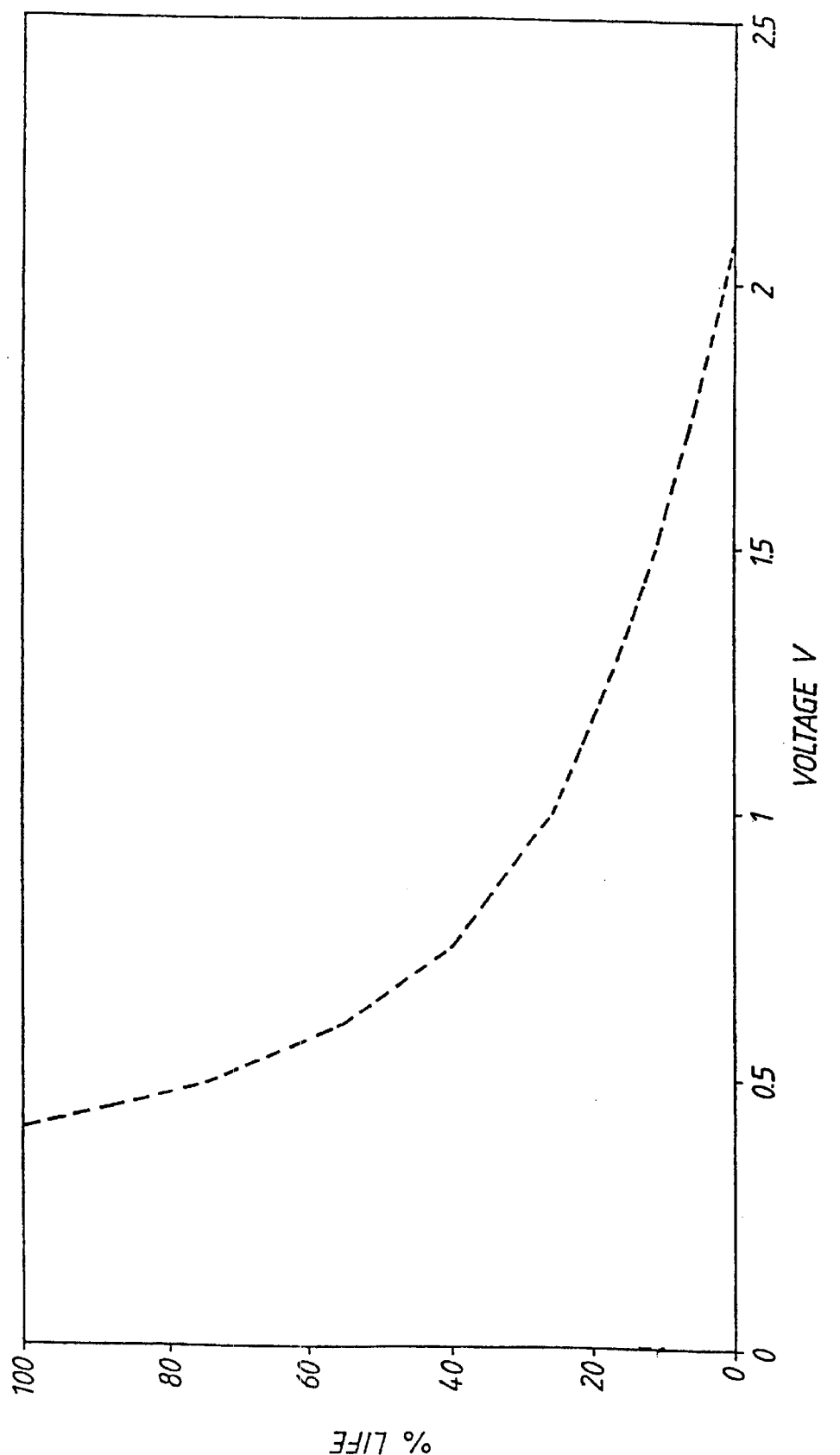
FIG. 2 is a graph plotting voltage output from a differential pressure transducer of the kind shown in FIG. 1 against percentage remaining useful life of the filter element of the assembly of FIG. 1.

A second example of such data is shown in the graph that is FIG. 2. In this graph, the voltage (v) of a transducer 20 measuring the pressure drop across a filter element 11 as particulate-laden fluid is flowed through the filter element 11 is plotted against the measured the percentage of remaining useful life. It will be seen that the relationship is non-linear but that for every voltage representing a differential pressure, it is possible to derive a percentage of remaining useful life.

It will be appreciated that a disc may contain data for ;any different filters and that a disc may be supplied with a new filter.

It will also be appreciated that the apparatus may be self-calibrating. This is achieved by measuring the differential pressure across the filter element 11 using the differential pressure transducer 20 and simultaneously measuring the time during which the filter is operational. If the filtration is halted at a differential pressure indicating the end of useful life of the filter, the processor can, from this data, derive the stored data needed for the processor 21 to output remaining life data during subsequent filtration operations. The time intervals are determined from the sampling intervals.

The apparatus described above is best suited for use when the flow-rate of the fluid through the element 11 does not vary with time. However, the processor 21 has an averaging programme and a peak detection programme, one or the other of which may be used when the flow rate is uneven. The averaging programme averages a predetermined number of the instantaneous signal values and uses the average value to determine the remaining time value from the stored data. The peak detection programme monitors a predetermined number of the instantaneous signal values and uses the highest value to determine the remaining time value from the stored data.

In addition to allowing the operator to predict with greater accuracy when the filter element 11 will need replacing or cleaning, the apparatus described above has a number of other advantages. For example, a number of different data sets corresponding to a number of alternative-pressure detectors or alternative fluids or alternative particle sizes can be formulated for use with the same element.

Additionally, it is not necessary that the pressure transducer 20 generates a signal which is linearly proportional to the differential pressure. As the stored data is formulated using values derived from a detector corresponding to the detector 20 any non-linearity will be compensated for by use of the look-up table.

Up to eight monitors of the type described above may be connected together to a single serial data transmission line (RS 232) for remote system control and data acquisition.

It will be appreciated that the device and the method described above may be varied. For example, the signal generated by the transducer 20 may be a sequence of discrete signals, each being related by a function to corresponding instantaneous values of the differential pressure. The transducer 20 itself could produce digital signals and in this case the digital-to-analogue converter would be omitted. The transducer 20 may be provided with a thermal lockout device that prevents actuation due to viscosity effects of the fluid.

The stored data could correlate differential pressure measurements with values of elapsed time. The processor 21 would then contain data relating the elapsed time to the remaining time.

The stored data could relate differential pressure measurements to indications of the remaining useful life of the filter medium 16 other than the blockage of the medium by particulates. For example, the look-up table could relate signal values to the weight of particles retained by the medium 16. The display 23 would then indicate remaining useful life based on the weight of particles retained by the filter element. The flow parameter measured need not be differential pressure. It could, for example, be simply inlet or outlet pressure.

It will be appreciated that the techniques described above are not limited to use in filters. Other measurements that vary non-linearly may be transformed to a linerar measurement using these techniques and the scope of the invention encompasses such wider uses.

What is claimed is:

1. A method of measuring remaining useful life of a filter comprising:

flowing a particulate-laden fluid through a filter;

measuring a parameter of the flow during the flowing; and producing, from the measurements of the parameter, measurements that indicate the remaining useful life of the filter in a way that varies generally linearly during the time that fluid is flowing through the filter, including storing in a store a previously measured correlation between the parameter and remaining useful life for a previous filter corresponding to the filter on flowing a particulate-laden fluid substantially corresponding to the particulate-laden fluid therethrough, the store receiving the measurements of the parameter and outputting measurements of the remaining useful life corresponding to the received measurements of the parameter and derived from the previously measured correlation for the previous filter.

2. A method according to claim 1 wherein the parameter is the pressure drop across the filter during the flowing.

3. A method according to claim 1 wherein the measurements of the remaining life are outputted from the store as a sequence of data.

4. A method according to claim 1 wherein the measurements of the remaining life are outputted from the store as a sequence of visible numbers.

5. A method according to claim 4 wherein the sequence of visible numbers is a sequence of percentages with 0% representing zero remaining usefull life.

6. A method according to claim 5 wherein the percentages are at 1% intervals commencing with 100% at the commencement of the flowing and ending at 0% when the remaining life is zero.

7. A method according to claim 1 wherein the filter has an internal volume, the measurement of remaining life being a measurement of the proportion of the internal volume of the filter blocked by the particulate during the flowing, the end of the life of the filter corresponding to a predetermined proportion of the internal volume blocked by the particulate.

8. A method according to claim 1 comprising flowing the particulate-laden fluid through the filter at a rate that varies with time, the method including applying averaging/peak detection techniques to the parameter measurements to modify the measurements before producing the remaining life measurements from the modified parameter measurements.

9. A method according to claim 1 further comprising storing the measurements of remaining useful life in the store.

10. A method according to claim 1 further comprising producing an alarm signal when the measurement of remaining life reaches a predetermined measurement at which the remaining useful life of the filter is zero.

* * * * *